US011345131B2

(12) United States Patent
Briffaud et al.

(10) Patent No.: US 11,345,131 B2
(45) Date of Patent: May 31, 2022

(54) BARRIER STRUCTURE BASED ON MPMDT/XT COPOLYAMIDE WITH A HIGH TG

(71) Applicant: ARKEMA FRANCE, Colombes (FR)

(72) Inventors: Thierry Briffaud, Bernay (FR); Mathieu Capelot, Bernay (FR); Nicolas Dufaure, Bernay (FR)

(73) Assignee: ARKEMA FRANCE, Colombes (FR)

( * ) Notice: Subject to any disclaimer, the term of this patent is extended or adjusted under 35 U.S.C. 154(b) by 72 days.

(21) Appl. No.: 16/062,231

(22) PCT Filed: Dec. 15, 2016

(86) PCT No.: PCT/FR2016/053466
§ 371 (c)(1),
(2) Date: Jun. 14, 2018

(87) PCT Pub. No.: WO2017/103502
PCT Pub. Date: Jun. 22, 2017

(65) Prior Publication Data

US 2018/0370208 A1 Dec. 27, 2018

(30) Foreign Application Priority Data

Dec. 18, 2015 (FR) ..................................... 15 62817

(51) Int. Cl.
*B32B 27/34* (2006.01)
*C08G 69/26* (2006.01)
(Continued)

(52) U.S. Cl.
CPC ................ *B32B 27/34* (2013.01); *B32B 7/10* (2013.01); *B32B 27/08* (2013.01); *B32B 27/20* (2013.01); *B32B 27/22* (2013.01); *B32B 27/285* (2013.01); *B32B 27/286* (2013.01); *B32B 27/302* (2013.01); *B32B 27/306* (2013.01); *B32B 27/365* (2013.01); *B65D 65/40* (2013.01); *C08G 69/265* (2013.01); *C08L 77/06* (2013.01); *B32B 2250/02* (2013.01); *B32B 2250/03* (2013.01); *B32B 2250/04* (2013.01); *B32B 2250/24* (2013.01); *B32B 2262/106* (2013.01); *B32B 2264/025* (2013.01); *B32B 2264/0207* (2013.01); *B32B 2264/0235* (2013.01); *B32B 2264/0257* (2013.01); *B32B 2264/10* (2013.01); *B32B 2264/108* (2013.01); *B32B 2270/00* (2013.01); *B32B 2307/306* (2013.01); *B32B 2307/546* (2013.01); *B32B 2307/7244* (2013.01); *B32B 2307/7265* (2013.01);
(Continued)

(58) Field of Classification Search
CPC ..... B32B 27/34; B32B 27/365; B32B 27/285; B32B 27/286; B32B 27/08; B32B 27/20; B32B 27/22; B32B 27/302; B32B 27/306; B32B 7/10; B32B 2264/0257; B32B 2264/0207; B32B 2264/108; B32B 2264/025; B32B 2264/0235; B32B 2264/10; B32B 2250/04; B32B 2250/03; B32B 2250/02; B32B 2250/24; B32B 2553/00; B32B 2307/546; B32B 2307/306; B32B 2307/7265; B32B 2605/18; B32B 2605/08; B32B 2605/12; B32B 2439/40; B32B 2439/60; B32B 2419/00; B32B 2597/00; B32B 2270/00; B32B 2262/106; C08K 2201/017; C08K 3/04; C08J 5/18; C08L 77/06; C08G 69/265; B65D 65/40
See application file for complete search history.

(56) References Cited

U.S. PATENT DOCUMENTS 2,705,227 A 3/1955 Stoeff
3,157,032 A 11/1964 Herpich
(Continued)

FOREIGN PATENT DOCUMENTS

CN 104211953 A 12/2014
EP 0 471 566 A1 2/1992
(Continued)

OTHER PUBLICATIONS

International Search Report (PCT/ISA/210) dated Mar. 22, 2017, by the European Patent Office as the International Searching Authority for International Application No. PCT/FR2016/053466.
(Continued)

*Primary Examiner* — James C Yager
(74) *Attorney, Agent, or Firm* — Buchanan Ingersoll & Rooney P.C.

(57) ABSTRACT

A barrier structure for the storage and/or transport of fluids, including at least one barrier layer (1) including an MPMDT/XT copolyamide in which: MPMDT is a unit with an amide motif having a molar ratio of between 5 and 50%, particularly between 5 and 45%, preferably between 15 and 45%, more preferably between 20 and 45%, where MPMD is 2-methyl pentamethylene diamine (MPMD) and T is terephthalic acid, XT being a unit with a majority amide motif having a molar ratio of between 50 and 95%, particularly between 55 and 95%, preferably between 55 and 85%, more preferably between 55 and 80%, where X is a C9 to C18, preferably C9, C10, C11 and C12, linear aliphatic diamine, and where T is terephthalic acid, the copolyamide having a melting point of 250° C.$<T_f\leq$300° C. as determined according to the ISO norm 1 1357-3 (2013).

28 Claims, No Drawings

(51) Int. Cl.

| | |
|---|---|
| ***C08L 77/06*** | (2006.01) |
| ***B32B 27/08*** | (2006.01) |
| ***B32B 27/28*** | (2006.01) |
| ***B32B 27/30*** | (2006.01) |
| ***B32B 7/10*** | (2006.01) |
| ***B32B 27/36*** | (2006.01) |
| ***B32B 27/20*** | (2006.01) |
| ***B32B 27/22*** | (2006.01) |
| ***B65D 65/40*** | (2006.01) |

(52) U.S. Cl.

CPC ....... *B32B 2419/00* (2013.01); *B32B 2439/40* (2013.01); *B32B 2439/60* (2013.01); *B32B 2553/00* (2013.01); *B32B 2597/00* (2013.01); *B32B 2605/08* (2013.01); *B32B 2605/12* (2013.01); *B32B 2605/18* (2013.01); *Y10T 428/1352* (2015.01); *Y10T 428/1379* (2015.01); *Y10T 428/1383* (2015.01)

(56) References Cited

U.S. PATENT DOCUMENTS

| | | | | |
|---|---|---|---|---|
| 3,287,443 | A | 11/1966 | Kazuo et al. | |
| 3,496,149 | A * | 2/1970 | Tsunawaki et al. | C08G 69/04 525/420 |
| 3,657,391 | A | 4/1972 | Curfman | |
| 3,808,180 | A | 4/1974 | Owens | |
| 3,985,704 | A | 10/1976 | Jones et al. | |
| 4,096,202 | A | 6/1978 | Farnham et al. | |
| 4,180,494 | A | 12/1979 | Fromuth et al. | |
| 4,260,693 | A | 4/1981 | Liu | |
| 4,299,928 | A | 11/1981 | Witman | |
| 6,467,508 | B1 * | 10/2002 | Emad | B32B 1/08 138/137 |
| 2008/0274355 | A1 | 11/2008 | Hewel | |
| 2009/0098325 | A1 | 4/2009 | Uchida et al. | |
| 2011/0195215 | A1 | 8/2011 | Briffaud et al. | |
| 2015/0267050 | A1 | 9/2015 | Briffaud et al. | |
| 2015/0353792 | A1 | 12/2015 | Montanari et al. | |
| 2017/0044317 | A1 | 2/2017 | Briffaud et al. | |

FOREIGN PATENT DOCUMENTS

| | | | |
|---|---|---|---|
| EP | 1 741 553 | A1 | 1/2007 |
| EP | 1 860 134 | A1 | 11/2007 |
| EP | 1 988 113 | A1 | 11/2008 |
| JP | 2014240148 | A | 12/2014 |
| JP | 2014240149 | A | 12/2014 |
| JP | 2015104830 | A | 6/2015 |
| WO | 2009/122060 | A2 | 10/2009 |
| WO | 2010/015786 | A1 | 2/2010 |
| WO | 2014/064375 | A1 | 5/2014 |
| WO | 2015/159014 | A1 | 10/2015 |

OTHER PUBLICATIONS

Written Opinion (PCT/ISA/237) dated Mar. 22, 2017, by the European Patent Office as the International Searching Authority for International Application No. PCT/FR2016/053466.

International Search Report (PCT/ISA/210) dated Mar. 22, 2017, by the European Patent Office as the International Searching Authority for International Application No. PCT/FR2016/053471.

Written Opinion (PCT/ISA/237) dated Mar. 22, 2017, by the European Patent Office as the International Searching Authority for International Application No. PCT/FR2016/053471.

* cited by examiner

BARRIER STRUCTURE BASED ON MPMDT/XT COPOLYAMIDE WITH A HIGH TG

FIELD OF THE INVENTION

The present invention relates to a barrier structure based on an MPMDT/XT copolyamide with a high Tg, said structure being devoid of reinforcing fibers. This structure can either consist of a single layer of this polyphthalamide or comprise a layer of MPMDT/XT polyphthalamide and at least one layer of another material.

This barrier structure is of use for objects intended for fluid storage and/or transport, such as bottles, tanks, containers, pipes and receptacles of any type. This structure can also be in the form of films with which are made, for example, packagings which require barrier properties against fluids such as gases. All these objects exhibit good barrier properties, that is to say very low permeability to fluids, in particular motor-vehicle fluids, in particular to fuels.

The invention also relates to the use of an MPMDT/XT copolyamide with a high Tg for producing a structure, in particular a multilayer structure, comprising at least one barrier layer comprising said MPMDT/XT copolyamide.

The invention also relates to the use of these structures and of these objects.

Prior Art and Technical Problem

Regardless of the fluid transported or stored in objects such as bottles, tanks, containers, pipes and receptacles of any type, the material in direct contact with the fluid must not be permeable to said fluid, whether the latter is a liquid or a gas.

Thus, in the motor vehicle field, and the transport field in general, the composition of fuels is constantly changing, in particular for ecological reasons, which is resulting in the gradual arrival of biofuels on the market. These fuels are more aggressive. Consequently, it proves to be essential to improve the quality of the thermoplastic parts in contact with these new fuels, such as pipes for transporting gasoline.

For reasons of safety and environmental preservation, motor vehicle manufacturers impose on these pipes both mechanical characteristics such as resistance to bursting and flexibility with a good impact strength under cold conditions (−40° C.) and at high temperature (125° C.), and also a very low permeability to hydrocarbons and to their additives, in particular alcohols such as methanol and ethanol. These tubes must also have good resistance to fuels and to engine lubrication oils.

Application WO 2014/064375 relates to a composition of or for a thermoplastic composite material with a matrix made of semicrystalline polyamide (PA) having a glass transition temperature Tg of at least 90° C. and a melting point Tm of less than or equal to 280° C., and also mechanical or structural parts based on said material, and to the use of the composition of the invention for parts made of composite material for applications in the motor vehicle, railroad, marine, road transport, wind power, sport, aeronautical and aerospace, construction, panel and leisure fields.

This composition can be used for the manufacture of mechanical parts involved in applications in the motor vehicle field, but no mention is made in this application of a structure comprising a layer which is a barrier to a fluid, in particular a fuel. Moreover, this composition always comprises reinforcing fibers.

EP 1 988 113 describes molding compositions based on a 10T/6T copolyamide with:

40 to 95 mol % of 10T 5 to 40% of 6T.

EP 1 988 113 is silent with regard to the barrier properties of structures consisting of a layer of these compositions.

EP 1 741 553 describes a multilayer structure comprising two or more layers comprising at least one layer (a) comprising (A) an aliphatic polyamide and a layer (b) comprising a semi-aromatic polyamide comprising at least 60 mol % of aliphatic diamine having from 9 to 13 carbon atoms and at least 50 mol % of terephthalic acid, the layer (b) being the inner layer.

EP 1 741 553 is completely silent with regard to the barrier properties of such a structure.

EP 1 860 134 describes a resin of semi-aromatic polyamide comprising dicarboxylic acid units in which from 50 to 100 mol % of the dicarboxylic acid units are aromatic dicarboxylic acid units, and diamine units in which from 60 to 100% of the diamine units are aliphatic diamine units having from 9 to 13 carbon atoms, said semi-aromatic polyamide having an amine chain end/acid chain end ratio of greater than or equal to 6.

EP 1 860 134 exemplifies in particular 9T/9'T (or 8MT/9T) compounds and shows that the alcohol resistance is reduced when said ratio is less than 6 and in particular is 4 or less.

International application WO 10/015786 relates to a copolyamide of formula A/10.T, in which:

A is chosen from a moiety obtained from an aminocarboxylic acid, a moiety obtained from a lactam and a moiety corresponding to the formula (Ca diamine). (Cb (cyclo) aliphatic diacid), with a representing the number of carbon atoms in the diamine and b representing the number of carbon atoms in the diacid, a and b each being between 4 and 36;

characterized in that it has a polydispersity index, noted PDI, of less than or equal to 3.5, measured by gel permeation chromatography.

WO 10/015786 is completely silent with regard to the barrier properties of such a structure.

WO 2015/159014 describes a process for producing a thermoplastic material comprising at least one step for injection molding or a step for processing by extrusion of a composition of polyamides. A very large number of polyamides are claimed, and although the polyamide composition can be used to produce a single-layer or multilayer structure, mention is in no way made of the barrier properties of the structure and in particular comprising the MXDT/XT copolyamide.

Moreover, these polyamides still remain to be improved, in particular in terms of crystallinity, of crystallization kinetics with a view to improving the temperature resistance of the copolyamide, of processability or else of improving their impact strength properties and also their barrier properties.

Thus, there is a real need to find polyphthalamides which have improved properties, in particular in terms of barrier properties.

BRIEF DESCRIPTION OF THE INVENTION

Surprisingly, it is been found that these needs are met with a structure comprising at least one layer comprising an MPMDT/XT polyamide, in which:

"MPMDT" denotes a unit comprising an amide moiety corresponding to the condensation product of 2-methylpentamethylenediamine and of terephthalic acid, XT denotes a unit comprising an amide moiety corresponding to the condensation product of X, which denotes the residues of an aliphatic, arylaliphatic, cycloaliphatic or aromatic amide, and T which denotes terephthalic acid.

MPMDT is present in a molar content ranging from 5 to 50%, in particular from 5 to 45%, preferably from 15 to 45%, more preferentially from 20 to 45%, where MPMD represents 2-methylpentamethylenediamine (MPMD) and T represents terephthalic acid, XT is a unit comprising a major amide moiety present in a molar content ranging from 50 to 95%, in particular from 55 to 95%, preferably from 55 to 85%, more preferentially from 55 to 80%, where X is a $C_9$ to $C_{18}$, preferably $C_9$, $C_{10}$, $C_{11}$ and $C_{12}$, linear aliphatic diamine and where T is terephthalic acid, said copolyamide having a melting point: 250° C.<$T_m$≤300° C. as determined according to the standard ISO 11357-3 (2013), said structure being devoid of reinforcing fibers.

It has thus been found that these products, originally developed for composite applications, owing to their high stiffness (high Tg)/good processability (relatively low Tm) compromise, also have a crystalline structure better than expectations and can be used as a barrier layer, that is to say a layer with very low permeability to fluids, in particular motor-vehicle fluids, in particular to fuels, in a structure, in particular a multilayer structure, for fluid transport, although the amine chain end/acid chain end ratio is in particular less than 5.

In other words, said structure is a barrier structure, in particular chosen from bottles, tanks, containers, pipes, receptacles and films, comprising at least one barrier layer (1) comprising an MPMDT/XT copolyamide as defined above.

The structure of the invention can either consist of a single layer of this polyamide, in which case it does not comprise reinforcing fibres, or comprise a layer comprising the MPMDT/XT polyamide (and therefore devoid of reinforcing fibers) and at least one layer of another material, it being possible for said at least one other layer to comprise reinforcing fibers.

In the structure of the invention, the layer comprising the MPMDT/XT polyamide can also comprise other polymers. By way of example of these other polymers, mention may be made of polyamides, EVOH, PPS, PPO, polycarbonate and ABS.

The invention also relates to the use of an MPMDT/XT copolyamide with a high Tg for producing a structure, in particular a multilayer structure, comprising at least one barrier layer comprising said MPMDT/XT copolyamide.

The invention also relates to bottles, tanks, containers, pipes and receptacles of any type manufactured with the above structure. This structure can also be in the form of films with which, for example, packagings are made. All these objects have good barrier properties.

The invention also relates to these objects and also to the use of these structures and of these objects.

DETAILED DESCRIPTION OF THE INVENTION

Other features, aspects, subjects and advantages of the present invention will emerge even more clearly on reading the description and the examples that follow.

According to a first aspect of the invention, the invention relates to a structure comprising at least one layer (1) comprising an MPMDT/XT copolyamide wherein:

MPMDT is a unit comprising an amide moiety present in a molar content ranging from 5 to 50%, in particular from 5 to 45%, preferably from 15 to 45%, more preferentially from 20 to 45%, where MPMD represents 2-methylpentamethylenediamine (MPMD) and T represents terephthalic acid, XT is a unit comprising a major amide moiety present in a molar content ranging from 50 to 95%, in particular from 55 to 95%, preferably from 55 to 85%, more preferentially from 55 to 80%, where X is a $C_9$ to $C_{18}$, preferably $C_9$, $C_{10}$, $C_{11}$ and $C_{12}$, linear aliphatic diamine and where T is terephthalic acid, said copolyamide having a melting point: 250° C.<$T_m$≤300° C. as determined according to the standard ISO 11357-3 (2013), and in the MPMDT and/or XT units, independently of one another, up to 30 mol %, relative to the total amount of dicarboxylic acids, of the terephthalic acid can be replaced with other aromatic, aliphatic or cycloaliphatic dicarboxylic acids comprising 6 to 36 carbon atoms, in particular 6 to 14 carbon atoms, and in the MPMDT and/or XT units, independently of one another, up to 30 mol % of the MPMD and/or where appropriate of X, relative to the total amount of diamines, can be replaced with other diamines comprising from 4 to 36 carbon atoms, in particular 6 to 12 carbon atoms, and in the copolyamide, no more than 30 mol %, relative to the total amount of monomers, can be formed by lactams or aminocarboxylic acids, and on the condition that the sum of the monomers which replace the terephthalic acid, the MPMD and X does not exceed a concentration of 30 mol %, relative to the total amount of monomers used in the copolyamide, and on the condition that the MPMD is not totally substituted, said composition being devoid of reinforcing fibers.

Consequently, the invention describes a structure which is at least monolayer and the single layer of which is based on MPMDT/XT.

It is quite obvious that, regardless of the present substitution that is carried out for the diacids and/or diamines, the proportion of MPMDT and of XT remains within the ranges of values indicated. For example, MPMDT, even when it is substituted with a diacid and/or a diamine, is in any case present in a molar content of at least 5% or of at least 15% or of at least 20%, depending on the value range claimed.

In the same way, the upper limit of these ranges of values is conserved.

Advantageously, the copolyamide has an amount of amine chain end groups/amount of acid chain end groups ratio <5, said amount of amine chain end groups and said amount of acid chain groups being determined by NMR.

Advantageously, MPMDT is present in a molar content of from 5 to 50% and XT is present in a molar content of from 50 to 95%.

Advantageously, MPMDT is present in a molar content of from 15 to 45% and XT is present in a molar content of from 50 to 85%.

Advantageously, MPMDT is present in a molar content of from 20 to 45% and XT is present in a molar content of from 50 to 80%.

Advantageously, MPMDT is present in a molar content of from 5 to 45% and XT is present in a molar content of from 55 to 95%.

Advantageously, MPMDT is present in a molar content of from 15 to 45% and XT is present in a molar content of from 55 to 85%.

Advantageously, MPMDT is present in a molar content of from 20 to 45% and XT is present in a molar content of from 55 to 80%.

MPMD and/or X can be replaced, independently of one another, up to 30 mol %, by other diamines defined above, in particular by a linear or branched aliphatic diamine, a cycloaliphatic diamine or an arylaromatic diamine.

By way of example, the linear or branched aliphatic diamine is chosen from 1,4-butanediamine, 1,5-pentanediamine, 1,6-hexanediamine, 1,8-octanediamine (OMDA), 1,9-nonanediamine (NMDA), 2-methyl-1,8-octanediamine (MODA), 2,2,4-trimethylhexamethylenediamine (TMHMD), 2,4,4-trimethylhexamethylenediamine (TMHMD), 5-methyl-1,9-nonanediamine, 1,11-undecanediamine, 2-butyl-2-ethyl-1,5-pentanediamine, 1,12-dodecanediamine, 1,13-tridecanediamine, 1,14-tetradecanediamine, 1,16-hexadecanediamine and 1,18-octadecanediamine.

The cycloaliphatic diamine can be chosen from cyclohexanediamine, 1,3-bis(aminomethyl)cyclohexane (BAC), 1,4-bis(aminomethyl)cyclohexane (BAC), isophoronediamine, norbornanedimethylamine, 4,4'-diaminodicyclohexylmethane (PACM), 2,2-(4,4'-diaminodicyclohexyl)propane (PACP) and 3,3'-dimethyl-4,4'-diaminodicyclohexylmethane (MACM).

The arylaromatic diamine may be m-xylenediamine.

T can be replaced, up to 30 mol %, by other dicarboxylic acids defined above, in particular by other aromatic, aliphatic or cycloaliphatic dicarboxylic acids.

The aromatic dicarboxylic acids can be chosen from naphthalenedicarboxylic acid (NDA) and isophthalic acid (IPS).

The aliphatic dicarboxylic acids can be chosen from adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid and dimerized fatty acids.

The cycloaliphatic dicarboxylic acids can be chosen from cis- and/or trans-1,4cyclohexane-dicarboxylic acid and/or cis- and/or trans-1,3cyclohexane-dicarboxylic acid (CHDA).

MPMD and/or X and/or T can be replaced, independently of one another, up to 30 mol %, by lactams or aminocarboxylic acids.

The lactams and aminocarboxylic acids can be chosen from caprolactam (CL), α,ω-aminocaproic acid, α,ω-aminononanoic acid, α,ω-aminoundecanoic acid (AUA), lauryllactam (LL) and α,ω-aminododecanoic acid (ADA).

A maximum of 30 mol %, relative to the total sum of the MPMD, X and T monomers, of replacement, whether it is with another diamine, another diacid, a lactam or an aminocarboxylic acid, or any mixture thereof, is possible.

Advantageously, a maximum of 20 mol %, relative to the total sum of the MPMD, X and T monomers, of replacement, whether it is with another diamine, another diacid, a lactam or an aminocarboxylic acid, or any mixture thereof, is possible.

Advantageously, a maximum of 10 mol %, relative to the total sum of the MPMD, X and T monomers, of replacement, whether it is with another diamine, another diacid, a lactam or an aminocarboxylic acid, or any mixture thereof, is possible.

Advantageously, X is a $C_9$ to $C_{18}$ diamine.

Advantageously, X is a $C_9$ to $C_{18}$ diamine and MPMDT is present in a molar content of from 5 to 50% and XT is present in a molar amount of from 50 to 95%.

Advantageously, X is a $C_9$ to $C_{18}$ diamine and MPMDT is present in a molar content of from 5 to 45% and XT is present in a molar amount of from 55 to 95%.

Advantageously, X is a $C_9$ to $C_{18}$ diamine and MPMDT is present in a molar content of from 15 to 45% and XT is present in a molar amount of from 55 to 85%.

Advantageously, X is a $C_9$ to $C_{18}$ diamine and MPMDT is present in a molar content of from 20 to 45% and XT is present in a molar amount of from 55 to 80%.

Advantageously, X is a $C_9$, $C_{10}$, $C_{11}$, $C_{12}$ diamine.

Advantageously, X is a $C_9$, $C_{10}$, $C_{11}$, $C_{12}$ diamine and MPMDT is present in a molar content of from 5 to 50% and XT is present in a molar amount of from 50 to 95%.

Advantageously, X is a $C_9$, $C_{10}$, $C_{11}$, $C_{12}$ diamine and MPMDT is present in a molar content of from 5 to 45% and XT is present in a molar amount of from 55 to 95%.

Advantageously, X is a $C_9$, $C_{10}$, $C_{11}$, $C_{12}$ diamine and MPMDT is present in a molar content of from 15 to 45% and XT is present in a molar amount of from 55 to 85%.

Advantageously, X is a $C_9$, $C_{10}$, $C_{11}$, $C_{12}$ diamine and MPMDT is present in a molar content of from 20 to 45% and XT is present in a molar amount of from 55 to 80%.

Advantageously, X is a $C_9$ diamine and MPMDT is present in a molar content of from 5 to 50% and XT is present in a molar amount of from 50 to 95%.

Advantageously, X is a $C_9$ diamine and MPMDT is present in a molar content of from 5 to 45% and XT is present in a molar amount of from 55 to 95%.

Advantageously, X is a $C_9$ diamine and MPMDT is present in a molar content of from 15 to 45% and XT is present in a molar amount of from 55 to 85%.

Advantageously, X is a $C_9$ diamine and MPMDT is present in a molar content of from 20 to 45% and XT is present in a molar amount of from 55 to 80%.

Advantageously, X is a $C_{10}$ diamine and MPMDT is present in a molar content of from 5 to 50% and XT is present in a molar amount of from 50 to 95%.

Advantageously, X is a $C_{10}$ diamine and MPMDT is present in a molar content of from 5 to 45% and XT is present in a molar amount of from 55 to 95%.

Advantageously, X is a $C_{10}$ diamine and MPMDT is present in a molar content of from 15 to 45% and XT is present in a molar amount of from 55 to 85%.

Advantageously, X is a $C_{10}$ diamine and MPMDT is present in a molar content of from 20 to 45% and XT is present in a molar amount of from 55 to 80%.

Advantageously, X is a $C_{11}$ diamine and MPMDT is present in a molar content of from 5 to 50% and XT is present in a molar amount of from 50 to 95%.

Advantageously, X is a $C_{11}$ diamine and MPMDT is present in a molar content of from 5 to 45% and XT is present in a molar amount of from 55 to 95%.

Advantageously, X is a $C_{11}$ diamine and MPMDT is present in a molar content of from 15 to 45% and XT is present in a molar amount of from 55 to 85%.

Advantageously, X is a $C_{11}$ diamine and MPMDT is present in a molar content of from 20 to 45% and XT is present in a molar amount of from 55 to 80%.

Advantageously, X is a $C_{12}$ diamine and MPMDT is present in a molar content of from 5 to 50% and XT is present in a molar amount of from 50 to 95%.

Advantageously, X is a $C_{12}$ diamine and MPMDT is present in a molar content of from 5 to 45% and XT is present in a molar amount of from 55 to 95%.

Advantageously, X is a $C_{12}$ diamine and MPMDT is present in a molar content of from 15 to 45% and XT is present in a molar amount of from 55 to 85%.

Advantageously, X is a $C_{12}$ diamine and MPMDT is present in a molar content of from 20 to 45% and XT is present in a molar amount of from 55 to 80%.

The expression "reinforcing fibers" or "fibrous reinforcement" denotes an assembly of short or long fibers. The fibers may be continuous, or in the form of unidirectional (UD) or multidirectional (2D, 3D) reinforcement, in the form of fabrics, sheets, strips or braids and can also be cut for example in the form of nonwovens (mats) or in the form of felts.

The expression "reinforcing fibers" denotes in particular:

- mineral fibers, in particular carbon fibers, which include fibers of nanotubes or carbon nanotubes (CNTs), carbon nanofibers or graphenes; silica fibers such as glass fibers, in particular of E, R or S2 type; boron fibers; ceramic fibers, in particular silicon carbide fibers, boron carbide fibers, boron carbonitride fibers, silicon nitride fibers, boron nitride fibers, basalt fibers; fibers or filaments based on metals and/or alloys thereof; fibers of metal oxides, in particular of alumina ($Al_2O_3$); metalized fibers such as metalized glass fibers and metalized carbon fibers, or mixtures of the abovementioned fibers;
- polymeric or polymer fibers, in particular:
  - fibers of thermosetting polymer and more particularly those chosen from: unsaturated polyesters, epoxy resins, vinyl esters, phenolic resins, polyurethanes, cyanoacrylates and polyimides, such as bismaleimide resins, or aminoplasts resulting from the reaction of an amine such as melamine with an aldehyde such as glyoxal or formaldehyde,
  - fibers of thermoplastic polymer and more particularly chosen from: polyethylene terephthalate (PET), polybutylene terephthalate (PBT), high-density polyolefins such as polyethylene (PE), polypropylene (PP) and PET/PP copolymers, or PVOH (polyvinyl alcohol),
  - fibers of polyamides corresponding to one of the formulae: 6, 11, 12, 610, 612, 66, 4.6,
  - fibers of aramids (such as Kevlar) and aromatic polyamides such as those corresponding to one of the formulae: PPDT, MPDI, PAA and PPA, with PPD and MPD being respectively p- and m-phenylenediamine, PAA being polyarylamides and PPA being polyphthalamides,
  - fibers of polyamide block copolymers such as polyamide/polyether, fibers of polyaryl ether ketones (PAEKs) such as polyether ether ketone (PEEK), polyether ketone ketone (PEKK) or polyether ketone ether ketone ketone (PEKEKK),
- or mixtures of the abovementioned fibers.

Consequently, all the reinforcing fibers defined above are excluded from the scope of the invention.

Advantageously, the amount of amine chain end is from 5 mmol/kg to 100 mmol/kg, preferentially from 20 mmol/kg to 80 mmol/kg and even more preferentially from 30 mmol/kg to 60 mmol/kg.

Advantageously, the amount of acid chain end is from 5 mmol/kg to 100 mmol/kg, preferentially from 20 mmol/kg to 80 mmol/kg and even more preferentially from 30 mmol/kg to 60 mmol/kg.

In one advantageous embodiment, the present invention relates to a structure as defined above, wherein said copolyamide defined above has a glass transition temperature Tg≥125° C., in particular a glass transition temperature Tg>125° C., determined according to the standard ISO 11357-2:2013.

In one advantageous embodiment, the present invention relates to a structure as defined above, wherein X is 1,10-decanediamine.

Advantageously, X is 1,10-decanediamine and MPMDT is present in a molar content of from 5 to 50% and XT is present in a molar amount of from 50 to 95%.

Advantageously, X is 1,10-decanediamine and MPMDT is present in a molar content of from 5 to 45% and XT is present in a molar amount of from 55 to 95%.

Advantageously, X is 1,10-decanediamine and MPMDT is present in a molar content of from 15 to 45% and XT is present in a molar amount of from 55 to 85%.

Advantageously, X is 1,10-decanediamine and MPMDT is present in a molar content of from 20 to 45% and XT is present in a molar amount of from 55 to 80%.

In one advantageous embodiment, the present invention relates to a structure as defined above, wherein none of the monomers of said copolyamide is substituted with another diamine, another dicarboxylic acid or a lactam.

The structure wherein none of the monomers is substituted is therefore of formula MPMDT/XT without any other presence of other diamine, of other dicarboxylic acid, of lactam or of aminocarboxylic acid.

In one advantageous embodiment, the present invention relates to a structure as defined above, wherein said layer (1) comprises an impact modifier and/or a modifier of core-shell type.

The term "impact modifier" should be understood as meaning a polyolefin-based polymer with a flexural modulus of less than 100 MPa measured according to standard ISO-178:2010 and a Tg of less than 0° C. (measured according to standard 11357-2: 2013 at the inflection point of the DSC thermogram), in particular a polyolefin, optionally coupled with a PEBA (pether-block-amide) having a flexural modulus <200 MPa.

In this advantageous embodiment, this polyolefin-based polymer is therefore present in the coployamide constituting the layer (1).

The polyolefin of the impact modifier may be functionalized or nonfunctionalized or be a mixture of at least one which is functionalized and/or at least one which is nonfunctionalized.

In particular, a portion or all of the polyolefins bears a function chosen from carboxylic acid, carboxylic anhydride and epoxide functions, and is in particular chosen from a copolymer of ethylene and propylene with elastomeric character (EPR), an ethylene-propylene-diene copolymer with elastomeric character (EPDM) and an ethylene/alkyl (meth) acrylate copolymer, an ethylene-higher alkene copolymer, in particular an ethylene-octene copolymer, or an ethylene-alkyl acrylate-maleic anhydride terpolymer.

Advantageously, the impact modifier is chosen from Fusabond F493, a Lotader®, in particular Lotader 5500 or Lotader 7500, Escor VA1801 or VA1803, Excelsior E1040, Amplify GR216, Tafmer MH5020 or Orevac IM800 or a mixture thereof; in this case they are in a ratio ranging from 0.1/99.9 to 99.9/0.1, preferentially 1/2 to 2/1 when they are in a mixture of two.

By way of example, the impact modifier is chosen from the following mixtures: F493/Lotader®, in particular F493/Lotader® 5500 or F493/Lotader® 7500.

The term "modifier of core-shell type" is also denoted "copolymer of core-shell type".

The "modifier of core-shell type" is in the form of fine particles with an elastomer core and at least one thermoplastic shell; the size of the particles is generally less than a micrometer and advantageously between 150 and 500 nm.

The "modifier of core-shell type" has an acrylic or butadiene base, unlike the impact modifier which has a polyolefin base.

Examples of cores that may be mentioned include isoprene or butadiene homopolymers, copolymers of isoprene with not more than 30 mol % of a vinyl monomer and copolymers of butadiene with not more than 30 mol % of a vinyl monomer. The vinyl monomer may be styrene, an alkylstyrene, acrylonitrile or an alkyl (meth)acrylate. Another core family consists of homopolymers of an alkyl (meth)acrylate and copolymers of alkyl (meth)acrylate with not more than 30 mol % of a vinyl monomer. The alkyl (meth)acrylate is advantageously butyl acrylate. The vinyl monomer may be styrene, an alkylstyrene, acrylonitrile, butadiene or isoprene. The core of the copolymer (A) may be totally or partly crosslinked. It suffices to add at least difunctional monomers in the course of preparation of the core; these monomers may be chosen from poly(meth) acrylic esters of polyols such as butylene di(meth)acrylate and trimethylolpropane trimethacrylate. Other difunctional monomers are, for example, divinylbenzene, trivinylbenzene, vinyl acrylate and vinyl methacrylate. The core may also be crosslinked by introducing therein, by grafting or as comonomer during the polymerization, unsaturated functional monomers such as unsaturated carboxylic acid anhydrides, unsaturated carboxylic acids and unsaturated epoxides. Examples that may be mentioned include maleic anhydride, (meth)acrylic acid and glycidyl methacrylate.

The shell(s) are homopolymers of styrene, of an alkylstyrene or of methyl methacrylate or copolymers comprising at least 70 mol % of one of these preceding monomers and at least one comonomer chosen from the other preceding monomers, vinyl acetate and acrylonitrile. The shell may also be functionalized by introducing therein, by grafting or as comonomer during the polymerization, unsaturated functional monomers such as unsaturated carboxylic acid anhydrides, unsaturated carboxylic acids and unsaturated epoxides. Examples that may be mentioned include maleic anhydride, (meth)acrylic acid and glycidyl methacrylate. By way of example, mention may be made of core-shell copolymers (A) having a polystyrene shell and core-shell copolymers (A) having a PMMA shell. Core-shell copolymers (A) having two shells, one made of polystyrene and the exterior one made of PMMA, also exist. Examples of copolymer (A) and also the process for preparing them are described in the following patents: U.S. Pat. Nos. 4,180,494, 3,808,180, 4,096,202, 4,260,693, 3,287,443, 3,657,391, 4,299,928, 3,985,704.

The "modifier of core-shell type" is thus different than the polyolefin of the impact modifier, especially in that the impact modifier reacts with the polyamide matrix, whereas the core-shell does not react therewith since the core of the latter is capable of reacting only with the shell thereof.

Advantageously, the impact modifier and/or the modifier of core-shell type is present at from 5 to 35% by weight relative to the weight of all the constituents of the copolyamide of the layer (1), in particular from 5 to 25% and more particularly from 5 to 15%.

Advantageously, the invention therefore relates to a structure as defined above, comprising at least one layer (1) comprising an MPMDT/XT copolyamide as defined above and comprising an impact modifier and/or a modifier of core-shell type in a proportion of from 5 to 35% by weight relative to the weight of all the constituents of the copolyamide, in particular from 5 to 25% and more particularly from 5 to 15%.

Advantageously, in the structures comprising an impact modifier and/or a modifier of co-shell type, X is 1,10-decanediamine.

In one advantageous embodiment, the present invention relates to a structure as defined above, wherein said structure consists of a single layer (1).

The invention therefore in this case relates to a monolayer pipe and, in this embodiment, no other layer is present.

In one advantageous embodiment, the present invention relates to a structure as defined above, wherein said layer (1) comprises a stabilizer chosen from an organic stabilizer, an inorganic stabilizer, in particular a copper-based stabilizer, and a mixture thereof.

The expression "organic stabilizer" or more generally a "combination of organic stabilizers", denotes a primary antioxidant of phenol type, a secondary antioxidant of phosphite type, or even optionally other stabilizers, such as a HALS, which means Hindered Amine Light Stabilizer (for example Tinuvin 770 from the company Ciba), a UV stabilizer (for example Tinuvin 312 from the company Ciba), a phenolic stabilizer or a phosphorus-based stabilizer. Use may also be made of antioxidants of amine type, such as Naugard 445 from the company Crompton or else polyfunctional stabilizers, such as Nylostab S-EED from the company Clariant.

The organic stabilizer present within the layer (1) can be chosen, without this list being restrictive, from:

- phenolic antioxidants, for example Irganox 245, Irganox 1010, Irganox 1098 from the company Ciba, Irganox MD1024 from the company Ciba, Lowinox 44B25 from the company Great Lakes, ADK Stab AO-80 from a company Adeka Palmarole,
- phosphorus-based stabilizers, such as phosphites, for example Irgafos 168 from the company Ciba,
- a UV absorber, such as Tinuvin 312 from the company Ciba,
- a HALS, as previously mentioned,
- a stabilizer of amine type, such as Naugard 445 from the company Crompton, or else of hindered amine type, such as Tinuvin 770 from the company Ciba,
- a polyfunctional stabilizer, such as Nylostab S-EED from the company Clariant.

It is of course possible to envision a mixture of two, or more, of these organic stabilizers.

Preferably, the organic stabilizer is present within the copolyamide of the layer (1) of the structure in a content of between 0.3 and 3% by weight relative to the total weight of the constituents of the copolyamide.

The expression "inorganic stabilizer" denotes a copper-based stabilizer. By way of example of such inorganic stabilizers, mention may be made of copper acetate and halides. Incidentally, other metals, such as silver, can optionally be considered, but said metals are known to be less effective. These copper-based compounds are typically combined with alkali metal halides, in particular potassium halides.

These inorganic stabilizers are more particularly used when the structures must have an improved long-term heat resistance in hot air, in particular for temperatures greater than or equal to 100-120° C., since they tend to prevent polymer chain cleavages.

More particularly, the term "copper-based stabilizer" is intended to mean a compound comprising at least one copper atom, in particular in ionic or ionizable form, for example in complex form.

The copper-based stabilizer present within the layer (1) can be chosen from cuprous chloride, cupric chloride, cuprous bromide, cupric bromide, cuprous iodide, cupric iodide, cuprous acetate and cupric acetate. Mention may be made of halides or acetates of other metals, such as silver, in combination with the copper-based stabilizer. These copper-based compounds are typically combined with alkali metal halides. A well-known example is the mixture of CuI and KI, where the CuI:KI ratio is typically between 1:5 and 1:15. An example of such a stabilizer is Polyadd P201 from the company Ciba.

Fuller details with regard to copper-based stabilizers will be found in the U.S. Pat. No. 2,705,227. Copper-based stabilizers, such as complexed coppers, have more recently emerged, for instance Bruggolen H3336, H3337, H3373 from the company Brüggemann.

Advantageously, the copper-based stabilizer is chosen from copper halides, copper acetate, copper halides or copper acetate as a mixture with at least one alkali metal halide, and mixtures thereof, preferably mixtures of copper iodide and potassium iodide (CuI/KI).

Preferably, the copper-based stabilizer is present in the layer (1) of the structure in a content of between 0.05 and 1.5% by weight relative to the total weight of the constituents of the copolyamide.

Preferably, the copper (1) comprises, in addition, no other transition metals.

Advantageously, the invention therefore relates to a structure as defined above, comprising at least one layer (1) comprising an MPMDT/XT copolyamide as defined above and comprising an impact modifier and/or a modifier of core-shell type in a proportion of from 5 to 35% by weight relative to the weight of all the constituents of the copolyamide and an organic stabilizer.

Advantageously, the invention therefore relates to a structure as defined above, comprising at least one layer (1) comprising an MPMDT/XT copolyamide as defined above and comprising an impact modifier and/or a modifier of core-shell type in a proportion of from 5 to 35% by weight relative to the weight of all the constituents of the copolyamide and an inorganic stabilizer, in particular a copper-based stabilizer.

Advantageously, the invention therefore relates to a structure as defined above, comprising at least one layer (1) comprising an MPMDT/XT copolyamide as defined above and comprising an impact modifier and/or a modifier of core-shell type in a proportion of from 5 to 35% by weight relative to the weight of all the constituents of the copolyamide and a mixture of organic stabilizer and of inorganic stabilizer, in particular a copper-based stabilizer.

Advantageously, the invention therefore relates to a structure as defined above, comprising at least one layer (1) comprising an MPMDT/XT copolyamide as defined above and comprising an impact modifier and/or a modifier of core-shell type in a proportion of from 5 to 25% by weight relative to the weight of all the constituents of the copolyamide and an organic stabilizer.

Advantageously, the invention therefore relates to a structure as defined above, comprising at least one layer (1) comprising an MPMDT/XT copolyamide as defined above and comprising an impact modifier and/or a modifier of core-shell type in a proportion of from 5 to 25% by weight relative to the weight of all the constituents of the copolyamide and an inorganic stabilizer, in particular a copper-based stabilizer.

Advantageously, the invention therefore relates to a structure as defined above, comprising at least one layer (1) comprising an MPMDT/XT copolyamide as defined above and comprising an impact modifier and/or a modifier of core-shell type in a proportion of from 5 to 25% by weight relative to the weight of all the constituents of the copolyamide and a mixture of organic stabilizer and of inorganic stabilizer, in particular a copper-based stabilizer.

Advantageously, the invention therefore relates to a structure as defined above, comprising at least one layer (1) comprising an MPMDT/XT copolyamide as defined above and comprising an impact modifier and/or a modifier of core-shell type in a proportion of from 5 to 15% by weight relative to the weight of all the constituents of the copolyamide and an organic stabilizer.

Advantageously, the invention therefore relates to a structure as defined above, comprising at least one layer (1) comprising an MPMDT/XT copolyamide as defined above and comprising an impact modifier and/or a modifier of core-shell type in a proportion of from 5 to 15% by weight relative to the weight of all the constituents of the copolyamide and an inorganic stabilizer, in particular a copper-based stabilizer.

Advantageously, the invention therefore relates to a structure as defined above, comprising at least one layer (1) comprising an MPMDT/XT copolyamide as defined above and comprising an impact modifier and/or a modifier of core-shell type in a proportion of from 5 to 15% by weight relative to the weight of all the constituents of the copolyamide and a mixture of organic stabilizer and of inorganic stabilizer, in particular a copper-based stabilizer.

Advantageously, in the structures comprising an impact modifier and/or a modifier of core-shell type and a stabilizer, X is 1,10-decanediamine.

In one advantageous embodiment, the present invention relates to a structure as defined above, wherein said layer (1) comprises an antistatic filler chosen from carbon black, graphite, carbon fibers and carbon nanotubes, in particular carbon black and carbon nanotubes.

In one advantageous embodiment, the present invention relates to a structure as defined above, wherein said layer (1) can comprise at least one additive chosen from an antioxidant, a heat stabilizer, a UV absorber, a light stabilizer, a lubricant, a mineral filler, a flame retardant, a nucleating agent, a plasticizer and a dye.

The reinforcing fibers are excluded from the additives, and in particular the term "mineral filler" excludes the reinforcing fibers.

Advantageously, the additive(s) are present in the layer (1) in a weight proportion of from 1 to 20%, in particular from 5 to 15%, relative to the total weight of the constituents of the layer (1).

In one advantageous embodiment, the present invention relates to a structure as defined above, wherein a second layer (2) is present, the layers (1) and (2) being capable of adhering to one another.

The expression "being capable of adhering to one another" means that, if the structure consists of two layers, the layers (1) and (2) at least partially adhere to one another.

If the structure comprises at least one third layer, said third layer can be placed between the layer (1) and the layer (2), in which case the layers (1) and (2) do not adhere to one another but, on the other hand, the layers (1) and (3) adhere to one another, as do the layers (3) and (2).

Advantageously, the structure consists of two layers (1) and (2) which adhere to one another.

Advantageously, said layer (2) comprises at least one polyamide chosen from an aliphatic polyamide and an aromatic polyamide, in particular an aliphatic polyamide.

Advantageously, said aliphatic polyamide results from the polycondensation of at least one lactam or of at least one aminocarboxylic acid, or of a diamine and of a dicarboxylic acid, or of a mixture thereof, the diamine being chosen from an aliphatic diamine and a cycloaliphatic diamine and the dicarboxylic acid being chosen from an aliphatic diacid and a cycloaliphatic diacid, or a mixture thereof.

The aminocarboxylic acid can be chosen from 9-aminononanoic acid, 10-aminodecanoic acid, 12-aminododecanoic acid and 11-aminoundecanoic acid and derivatives thereof, in particular N-heptyl-11-aminoundecanoic acid, advantageously 12-aminododecanoic acid and 11-aminoundecanoic acid.

The lactam can be chosen from pyrrolidinone, 2-piperidinone, caprolactam, enantholactam, caprylolactam, pelargolactam, decanolactam, undecanolactam and lauryllactam, advantageously undecanolactam and lauryllactam.

When the diamine is aliphatic and linear, it has the formula $H_2N—(CH_2)_a—NH_2$. The diacid may be aliphatic (in particular linear aliphatic), cycloaliphatic or aromatic.

Preferentially, when the diamine is linear and aliphatic, it is chosen from butanediamine (a=4), pentanediamine (a=5), hexanediamine (a=6), heptanediamine (a=7), octanediamine (a=8), nonanediamine (a=9), decanediamine (a=10), undecanediamine (a=11), dodecanediamine (a=12), tridecanediamine (a=13), tetradecanediamine (a=14), hexadecanediamine (a=16), octadecanediamine (a=18), octadecanediamine (a=18), eicosanediamine (a=20), docosanediamine (a=22) and diamines obtained from dimerized fatty acids.

When the diamine is cycloaliphatic, it is preferably chosen from those comprising two rings. They in particular correspond to the following general formula:

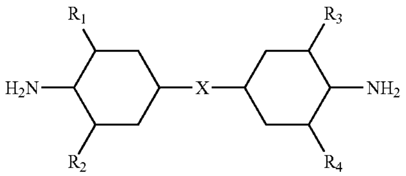

in which:

- $R_1$, $R_2$, $R_3$ and $R_4$ independently represent a group chosen from a hydrogen atom or an alkyl having from 1 to 6 carbon atoms and
- X represents either a single bond, or a divalent group consisting:
  - of a linear or branched aliphatic chain comprising from 1 to 10 carbon atoms, optionally substituted by cycloaliphatic or aromatic groups having from 6 to 8 carbon atoms,
  - of a cycloaliphatic group having from 6 to 12 carbon atoms.

More preferentially, the Ca cycloaliphatic diamine of the polyamide is chosen from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis-(3-methyl-4-aminocyclohexyl)methane (noted BMACM, MACM or B), p-bis(aminocyclohexyl)methane (PACM) and isopropylidenedi(cyclohexylamine) (PACP).

A nonexhaustive list of these cycloaliphatic diamines is given in the publication "Cycloaliphatic Amines" (Encyclopedia of Chemical Technology, Kirk-Othmer, 4th Edition (1992), pp. 386-405).

The aliphatic and linear dicarboxylic acid is chosen from succinic acid (b=4), pentanedioic acid (b=5), adipic acid (b=6), heptanedioic acid (b=7), octanedioic acid (b=8), azelaic acid (b=9), sebacic acid (b=10), undecanedioic acid (b=11), dodecanedioic acid (b=12), brassylic acid (b=13), tetradecanedioic acid (b=14), hexadecanedioic acid (b=16), octadecanoic acid (b=18), octadecenedioic acid (b=18), eicosanedioic acid (b=20), docosanedioic acid (b=22) and fatty acid dimers containing 36 carbons.

The fatty acid dimers mentioned above are dimerized fatty acids obtained by oligomerization or polymerization of unsaturated monobasic fatty acids bearing a long hydrocarbon chain (such as linoleic acid and oleic acid), as described in particular in document EP 0 471 566.

When the diacid is cycloaliphatic, it may comprise the following carbon backbones: norbornylmethane, cyclohexylmethane, dicyclohexylmethane, dicyclohexylpropane, di(methylcyclohexyl)propane.

The polyamide of the layer (2) may be a homopolyamide or a copolyamide.

The nomenclature used to define the polyamides is described in the standard ISO 16396-1: 2015 "Plastics—Polyamide (PA) molding and extrusion materials—Part 1: Designation system, marking of products and basis for specifications".

Advantageously, the polyamide of the layer (2) is chosen from PA11, PA12, PA1010, PA1012, PA610 and PA612.

In one advantageous embodiment, the present invention relates to a structure as defined above, wherein another polyamide, different than that of the layer (2) can be present in the layer (2).

Said other polyamide is as defined above in the layer (2) on the condition that it is different than that of the layer (2).

Advantageously, a plasticizer is present in the layer (2).

Advantageously, the plasticizer of the layer (2) is present at from 1 to 20%, in particular from 5 to 15%, by weight relative to the weight of all the constituents of the copolyamide of the layer (2).

In one advantageous embodiment, the present invention relates to a structure as defined above, wherein an impact modifier and/or a modifier of core-shell type is present in the layer (2).

The impact modifier and/or the modifier of core-shell type are as defined above.

Advantageously, the impact modifier and/or the modifier of core-shell type is present at from 5 to 35% by weight relative to the weight of all the constituents of the copolyamide of the layer (2), in particular from 5 to 25% and more particularly from 5 to 15%.

In one advantageous embodiment, the present invention relates to a structure as defined above, wherein a second layer (2) is present, the layers (1) and (2) adhering to one another, the layer (1) being one of those defined above, and the layer (2) optionally comprising another polyamide, the layer (2) comprising a plasticizer at from 1 to 20% by weight and an impact modifier and/or a modifier of core-shell type in a proportion of from 5 to 35% by weight relative to the weight of all the constituents of the copolyamide of the layer (2).

In one advantageous embodiment, the present invention relates to a structure as defined above, wherein a second layer (2) is present, the layers (1) and (2) adhering to one another, the layer (1) being one of those defined above, and the layer (2) optionally comprising another polyamide, the layer (2) comprising a plasticizer at from 1 to 20% by weight and an impact modifier and/or a modifier of core-shell type in a proportion of from 5 to 25% by weight relative to the weight of all the constituents of the copolyamide of the layer (2).

In one advantageous embodiment, the present invention relates to a structure as defined above, wherein a second layer (2) is present, the layers (1) and (2) adhering to one another, the layer (1) being one of those defined above, and the layer (2) optionally comprising another polyamide, the layer (2) comprising a plasticizer at from 5 to 15% by weight and an impact modifier and/or a modifier of core-shell type in a proportion of from 5 to 35% by weight relative to the weight of all the constituents of the copolyamide of the layer (2).

In one advantageous embodiment, the present invention relates to a structure as defined above, wherein a second layer (2) is present, the layers (1) and (2) adhering to one another, the layer (1) being one of those defined above, and the layer (2) optionally comprising another polyamide, the layer (2) comprising a plasticizer at from 5 to 15% by weight and an impact modifier and/or a modifier of core-shell type in a proportion of from 5 to 25% by weight relative to the weight of all the constituents of the copolyamide of the layer (2).

In one advantageous embodiment, the present invention relates to a structure as defined above, wherein a second layer (2) is present, wherein said layer (2) comprises a stabilizer chosen from an organic stabilizer, an inorganic stabilizer, in particular a copper-based stabilizer, and a mixture thereof.

The stabilizers are as defined above.

In one advantageous embodiment, the present invention relates to a structure as defined above, wherein a second layer (2) is present, wherein the layer (1) comprises an organic stabilizer and the layer (2) comprises an inorganic stabilizer, in particular a copper-based stabilizer.

In one advantageous embodiment, the present invention relates to a structure as defined above, wherein a second layer (2) is present, wherein the layer (1) comprises an inorganic stabilizer, in particular a copper-based stabilizer, and the layer (2) comprises an organic stabilizer.

In one advantageous embodiment, the present invention relates to a structure as defined above, wherein a second layer (2) is present, wherein said layer (2) comprises an antistatic filler chosen from carbon black, graphite, carbon fibers and carbon nanotubes, in particular carbon black and carbon nanotubes.

In one advantageous embodiment, the present invention relates to a structure as defined above, wherein a second layer (2) is present, wherein said layer (2) can comprise at least one additive chosen from an antioxidant, a heat stabilizer, a UV absorber, a light stabilizer, a lubricant, a mineral filler, a flame retardant, a nucleating agent and a dye.

In one advantageous embodiment, the present invention relates to a structure as defined above, wherein the layer (1) is a barrier layer, in particular a barrier to a fluid, said fluid being chosen from a fuel, said fuel being a gasoline, in particular a biogasoline (mixture of gasoline and of alcohol, in particular of methanol or ethanol), or diesel, in particular biodiesel, an oil, a brake fluid, urea solutions, a glycol-based cooling fluid, a gas, in particular compressed air, and said barrier layer (1) is in contact with the fluid.

The structure defined in this embodiment therefore comprises at least one layer (1) and can therefore be a monolayer or bilayer (1) and (2), but should the structure comprise other layers, this would not depart from the context of the invention.

Advantageously, the structure consists of two layers (1) and (2) and the layer (1) is the barrier layer.

Consequently, in the case where the structure comprises two layers, it comprises, from the outside to the inside, the following layers: (2)//(1).

In the case where the structure comprises at least one other layer, the latter cannot be in contact with the fluid.

In one advantageous embodiment, the present invention relates to a structure comprising at least one layer (1) as defined above, and a second layer (2) as defined above, the layers (1) and (2) being capable of adhering to one another, additionally comprising a layer (3), the layer (3) being identical to or different than the layer (1).

In this embodiment, the structure comprises or consists of the following layers, from the outside to the inside:

(3)//(2)//(1) or (2)//(3)//(1).

Advantageously, the layer (3) is different than the layer (1) and is a tie layer and the structure comprises, from the outside to the inside, the following layers: (2)//(3)//(1), the layer (1) being in contact with the fluid.

Advantageously, in the structure (2)//(3)//(1), the layer (1) has a thickness of from 100 to 300 μm, in particular from 200 to 300 μm, in particular 250 μm, the layer (3) has a thickness of from 50 to 100 μm or from 100 to 200 μm, in particular 150 μm and the layer (2) as a thickness of from 50 to 800 μm, in particular from 50 to 200 μm or from 500 to 700 μm.

The tie layer can be a mixture of at least one polyamide having an average number of carbon atoms per nitrogen atom noted of between 4 and 8.5, advantageously between 4 and 7; at least one polyamide having a melting point greater than or equal to 180° C. and an average number of carbon atoms per nitrogen atom of between 7 and 10, advantageously between 7.5 and 9.5, and at least one polyamide having an average number of carbon atoms per nitrogen atom of between 9 and 18, advantageously between 10 and 18, in particular as defined in document WO 09/122060.

In one advantageous embodiment, the present invention relates to a structure comprising at least one layer (1) as defined above, a second layer (2) as defined above, the layers (1) and (2) being capable of adhering to one another, and a layer (3), the layer (3) being identical to or different than the layer (1), said structure additionally comprising at least one other layer (4), the layer (1) being in contact with the fluid.

Advantageously, the layer (4) is a layer of EVOH.

In one advantageous embodiment, the present invention relates to a structure comprising at least one layer (1) as defined above, and a second layer (2) as defined above, the layers (1) and (2) being capable of adhering to one another, and a layer (3), the layer (3) being identical to or different than the layer (1), and at least one other layer (4), the layer (1) being in contact with the fluid, said structure comprising, from the outside to the inside, the following layers: (2)//(4)//(3)//(1), the layer (1) being in contact with the fluid.

Advantageously, in the structure (2)//(4)//(3)//(1), the layer (3) is a tie layer as defined above.

Advantageously, in the structure (2)//(4)//(3)//(1), the layer (4) is a layer of EVOH as defined above.

Advantageously, in the structure (2)//(4)//(3)//(1), the layer (3) is a tie layer as defined above and the layer (4) is a layer of EVOH as defined above.

Advantageously, the structure consists of the layers (2)//(4)//(3)//(1) as defined above.

In one advantageous embodiment, the present invention relates to a structure comprising at least one layer (1) as defined above, a second layer (2) as defined above, the layers (1) and (2) being capable of adhering to one another, a layer (3), the layer (3) being identical to or different than the layer (1), at least one other layer (4), the layer (1) being in contact with the fluid, and comprising, from the outside to the inside, the following layers: (2)//(4)//(3)//(1), the layer (1) being in contact with the fluid.

Said structure additionally comprising a tie layer (3'), identical to or different than the tie layer (3), is present.

The layer (3') is therefore a tie of the same type as that defined above for the layer (3), but of identical or different composition.

Advantageously, said structure additionally comprising a tie layer (3') comprises, from the outside to the inside, the following layers: (2)//(3')//(4)//(3)//(1), the layer (1) being in contact with the fluid.

Advantageously, the layer (1) has a thickness of from 100 to 200 μm, in particular 150 μm, the layer (2) has a thickness of from 100 to 200 μm, in particular 150 μm, the layer (3) has a thickness of from 200 to 400 μm, in particular 300 μm, the layer (3') has a thickness of from 200 to 400 μm, in particular 300 μm, and the layer (4) has a thickness of from 50 μm to 150 μm, in particular 100 μm.

According to another aspect, the present invention relates to bottles, tanks, containers, pipes and receptacles manufactured with one of the structures as defined above.

According to another aspect, the present invention relates to packagings consisting of the films manufactured with one of the structures as defined above.

According to another aspect, the present invention relates to the use of an MPMDT/XT polyamide wherein:

- MPMDT is a unit comprising an amide moiety present in a molar content ranging from 5 to 50%, in particular from 5 to 45%, preferably from 15 to 45%, more preferentially from 20 to 45%, where MPMD represents 2-methylpentamethylenediamine (MPMD) and T represents terephthalic acid,
- XT is a unit comprising a major amide moiety present in a molar content ranging from 50 to 95%, in particular from 55 to 95%, preferably from 55 to 85%, more preferentially from 55 to 80%, where X is a $C_9$ to $C_{18}$, preferably $C_9$, $C_{10}$, $C_{11}$ and $C_{12}$, linear aliphatic diamine and where T is terephthalic acid,
- said copolyamide having a melting point: 250° C.$<T_m\leq$300° C. as determined according to the standard ISO 11357-3 (2013),
  - in the MPMDT and/or XT units, independently of one another, up to 30 mol %, relative to the total amount of dicarboxylic acids, of the terephthalic acid can be replaced with other aromatic, aliphatic or cycloaliphatic dicarboxylic acids comprising 6 to 36 carbon atoms, in particular 6 to 14 carbon atoms, and
  - in the MPMDT and/or XT units, independently of one another, up to 30 mol % of the MPMD and/or where appropriate of X, relative to the total amount of diamines, can be replaced with other diamines comprising from 4 to 36 carbon atoms, in particular 6 to 12 carbon atoms, and
  - in the copolyamide, no more than 30 mol %, relative to the total amount of monomers, can be formed by lactams or aminocarboxylic acids, and
  - on the condition that the sum of the monomers which replace the terephthalic acid, the MPMD and X does not exceed a concentration of 30 mol %, relative to the total amount of monomers used in the copolyamide, and
  - on the condition that the MPMD is not totally substituted, for the production of a structure, in particular a multilayer structure, comprising at least one barrier layer (1) comprising said MPMDT/XT polyamide,
- said composition being devoid of reinforcing fibers.

All the features and all the embodiments defined above for the structures can apply for the use defined above.

EXAMPLES

1) Preparation of an MPMDT/10T and of Comparative Polyamides 5 kg of the following starting materials are introduced into a 14-liter autoclave reactor:

- 500 g of water,
- the diamine or diamines,
- the amino acid (optionally),
- the diacid or diacids,
- the monofunctional chain regulator: benzoic acid or stearic acid in an amount suitable for the intended viscosity,
- 35 g of sodium hypophosphite in solution,
- 0.1 g of a Wacker AK1000 antifoaming agent (Wacker Silicones).

The nature and molar ratios of the molecular structures and moieties of the polyamides (by referenced test) are given in table 1 below.

The closed reactor is purged of its residual oxygen and then heated to a temperature of 230° C. with respect to the material introduced. After stirring for 30 minutes under these conditions, the pressurized vapor which has formed in the reactor is gradually reduced in pressure over 60 minutes, while gradually increasing the material temperature so that it becomes established at Tm+10° C. at atmospheric pressure. The polymerization is then continued under nitrogen flushing of 20 l/h until the intended viscosity shown in the characteristics table is obtained.

The polymer is subsequently emptied out via the bottom valve, then cooled in a water trough and then granulated.

The products are then injection-molded in the form of 100 mm×100 mm×1 mm plates by means of an injection-molding press using an injection-molding temperature equal to Tm+20° C. and a mold heated to 100° C. The plates which are not entirely crystalline (presence of recrystallization on DSC heating according to ISO 11357-2:2013) are annealed for 2 h under vacuum at Tg+30° C.

The measurement of the intrinsic or inherent viscosity is carried out in m-cresol. The method is well known to those skilled in the art. The standard ISO 307:2007 is followed, but changing the solvent (use of m-cresol instead of sulfuric acid), the temperature being 20° C. and the concentration being 0.5% by weight.

The glass transition temperature Tg of the thermoplastic polymers used is measured using a differential scanning calorimeter (DSC), after a second heating pass, according to the standard ISO 11357-2:2013. The heating and cooling rate is 20° C./min.

The melting point Tm and the crystallization temperature Tc are measured by DSC, after a first heating, according to the standard ISO 11357-3:2013. The heating and cooling rate is 20° C./min.

The heat of crystallization of said matrix polymer is measured by differential scanning calorimetry (DSC) according to the standard ISO 11357-3:2013.

The content of amine and acid chain ends is determined by means of NMR spectrometry.

The measurements of permeability to gasolines are determined at 60° C. according to a gravimetric method with CE10: isooctane/toluene/ethanol=45/45/10 vol % and CE85: isooctane/toluene/ethanol=7.5/7.5/85 vol %.

The instantaneous permeability is zero during the induction period, then it gradually increases up to an equilibrium value which corresponds to the permeability value under continuous operating conditions. This value, obtained under continuous operating conditions, is considered to be the permeability of the material.

The results are presented in the following table 1.

TABLE 1

| Ref | Test type | Molecular structure/ Molar composition | Tm (° C.)/ Tg (° C.) | Inherent viscosity (m-cresol) | Permeability CE10 $g \cdot mm/m^2 \cdot 24$ h | Permeability CE85 $g \cdot mm/m^2 \cdot 24$ h | $NH_2$ mmol/kg $CO_2H$ mmol/kg |
|---|---|---|---|---|---|---|---|
| 1 | According to the invention | MPMDT/10T 41/59 | 269/131 | 1.20 | 0.4 | 2.4 | 47 38 |
| 2 | Comparative EP1741553 | 8MT/9T 48/52 | 265/125 | 1.25 | 0.5 | 3.2 | |
| 3 | Comparative | 10I/10T 33.3/66.6 | 283/107 | 1.11 | 0.4 | 7 | |
| 4 | Comparative EP1988113 | 10T/6T/11 42.5/42.5/15 | 269/114 | 1.25 | 0.8 | 5 | |
| 5 | Comparative EP1988113 | 10T/6T/11 61/24.5/14.5 | 269/111 | 1.25 | 0.35 | 6 | |
| 6 | Comparative | 10T/10I/11 64/20.5/15.5 | 265/100 | 1.15 | 2.75 | 20 | |
| 7 | Comparative | 11/6T 35/65 | 312/100 | 1.21 | 0.65 | 6.7 | |
| 8 | Comparative | 11/6T 50/50 | 273/79 | 1.05 | 20 | 76 | |
| 9 | Comparative | 11/10T 33.3/66.6 | 269/85 | 1.18 | 3.1 | 13 | |

The compounds of the invention show improved permeability compared with the comparative examples.

The invention claimed is:

1. A barrier structure chosen from bottles, tanks, containers, pipes, receptacles and films, comprising at least one barrier layer (1) comprising an MPMDT/XT copolyamide wherein:

MPMDT is a unit comprising an amide moiety present in a molar content ranging from 5 to 50%, where MPMD represents 2-methylpentamethylenediamine (MPMD) and T represents terephthalic acid, XT is a unit comprising a major amide moiety present in a molar content ranging from 50 to 95%, where X is a $C_9$ to $C_{18}$, linear aliphatic diamine and where T is terephthalic acid, said copolyamide having a melting point: 250° C.$<T_m\leq$300° C. as determined according to the standard ISO 11357-3 (2013), wherein said copolyamide has a glass transition temperature Tg of greater than 125° C., determined according to the standard ISO 11357-2: 2013, in the MPMDT and/or XT units, independently of one another, up to 30 mol %, relative to the total amount of dicarboxylic acids, of the terephthalic acid can be replaced with other aromatic, aliphatic or cycloaliphatic dicarboxylic acids comprising 6 to 36 carbon atoms, and in the MPMDT and/or XT units, independently of one another, up to 30 mol % of the MPMD and/or where appropriate of X, relative to the total amount of diamines, can be replaced with other diamines comprising from 4 to 36 carbon atoms, in particular 6 to 12 carbon atoms, and in the copolyamide, no more than 30 mol %, relative to the total amount of monomers, can be formed by lactams or aminocarboxylic acids, and on the condition that the sum of the monomers which replace the terephthalic acid, the MPMD and X does not exceed a concentration of 30 mol %, relative to the total amount of monomers used in the copolyamide, and on the condition that the MPMD is not totally substituted, said at least one barrier layer (1) being devoid of reinforcing fibers, wherein, regardless of the substitution that is carried out for the diacids and/or diamines, the proportion of MPMDT/XT remains within the range 5 to 45 mol % and of XT remains within the range of 55 to 95 mol %, wherein said barrier structure further comprises a second layer (2), the layers (1) and (2) being capable of adhering to one another, wherein said layer (2) is formed from one or more aliphatic polyamides, wherein the aliphatic polyamides are formed from the polycondensation of at least one lactam and of at least one aminocarboxylic acid, of at least one aliphatic or cycloaliphatic diamine and at least one aliphatic or cycloaliphatic dicarboxylic acid, or of a mixture thereof, and wherein layer (1) is the layer in contact with a fuel.

2. The barrier structure as claimed in claim 1, wherein said copolyamide has a glass transition temperature Tg≥131° C. determined according to the standard ISO 11357-2: 2013.

3. The barrier structure as claimed in claim 1, wherein X is 1,10-decanediamine.

4. The barrier structure as claimed in claim 1, wherein none of the monomers of said copolyamide is substituted with another diamine, another dicarboxylic acid or a lactam.

5. The barrier structure as claimed in claim 1, wherein said layer (1) comprises an impact modifier and/or a modifier of core-shell type.

6. The barrier structure as claimed in claim 1, wherein said layer (1) comprises a stabilizer chosen from an organic stabilizer, an inorganic stabilizer, and a mixture thereof.

7. The barrier structure as claimed in claim 1, wherein said layer (1) comprises an antistatic filler chosen from carbon black, graphite, carbon fibers and carbon nanotubes.

8. The barrier structure as claimed in claim 1, wherein said layer (1) comprises at least one additive chosen from an antioxidant, a heat stabilizer, a UV absorber, a light stabilizer, a lubricant, a mineral filler, a flame retardant, a nucleating agent, a plasticizer and a dye.

9. The barrier structure as claimed in claim 1, wherein said one or more aliphatic polyamides of the layer (2) is chosen from PA11, PA12, PA1010, PA1012, PA610 and PA612.

10. The barrier structure as claimed in claim 1, wherein a plasticizer is present in the layer (2).

11. The barrier structure as claimed in claim 1, wherein an impact modifier is present in the layer (2).

12. The barrier structure as claimed in claim 1, wherein said layer (2) comprises a stabilizer chosen from an organic stabilizer, an inorganic stabilizer, and a mixture thereof.

13. The barrier structure as claimed in claim 1, wherein the layer (1) comprises an organic stabilizer and the layer (2) comprises an inorganic stabilizer.

14. The barrier structure as claimed in claim 1, wherein the layer (1) comprises an inorganic stabilizer, and the layer (2) comprises an organic stabilizer.

15. The barrier structure as claimed in claim 1, wherein said layer (2) comprises an antistatic filler chosen from carbon black, graphite, carbon fibers and carbon nanotubes.

16. The barrier structure as claimed in claim 1, wherein said layer (2) comprises at least one additive chosen from an antioxidant, a heat stabilizer, a UV absorber, a light stabilizer, a lubricant, a mineral filler, a flame retardant, a nucleating agent, and a dye.

17. The barrier structure as claimed in claim 1, wherein the layer (1) is a barrier layer, said fuel being a gasoline, or diesel, an oil, a brake fluid, urea solutions, a glycol-based cooling fluid, a gas, said barrier layer (1) being in contact with the fluid.

18. The barrier structure as claimed in claim 1, additionally comprising a layer (3), the layer (3) being identical to or different than the layer (1).

19. The barrier structure as claimed in claim 18, wherein the layer (3) is different than the layer (1) and is a tie layer and the structure comprises, from the outside to the inside, the following layers: (2)//(3)//(1), the layer (1) being in contact with said fuel.

20. The barrier structure as claimed in claim 19, wherein at least one other layer (4) is present, the layer (1) being in contact with said fuel.

21. The barrier structure as claimed in claim 20, wherein the layer (4) is a layer of EVOH.

22. The barrier structure as claimed in claim 20, wherein the structure comprises, from the outside to the inside, the following layers: (2)//(4)//(3)//(1), the layer (1) being in contact with said fuel.

23. The barrier structure as claimed in claim 20, wherein a tie layer (3'), identical to or different than the tie layer (3), is present.

24. The barrier structure as claimed in claim 23, wherein the structure comprises, from the outside to the inside, the following layers: (2)//(3')//(4)//(3)//(1), the layer (1) being in contact with said fuel.

25. Bottles, tanks, containers, pipes and receptacles manufactured with the structure as claimed in claim 1.

26. Packagings consisting of the films manufactured with the structure as claimed in claim 1.

27. The barrier structure as claimed in claim 1, wherein the aliphatic diamine of the one or more aliphatic polyamides in the second layer is chosen from butanediamine, pentanediamine, heptanediamine, octanediamine, nonanediamine, undecanediamine, dodecanediamine, tridecanediamine, tetradecanediamine, hexadecanediamine, octadecanediamine, eicosanediamine, docosanediamine or diamines obtained from dimerized fatty acids.

28. The barrier structure as claimed in claim 1, wherein the second layer (2) comprises reinforcing fibers.

* * * * *